US012127511B2

(12) United States Patent
Renner

(10) Patent No.: US 12,127,511 B2
(45) Date of Patent: Oct. 29, 2024

(54) STATION AND SYSTEM FOR A SELF-MOVING DEVICE

(71) Applicant: HUSQVARNA AB, Huskvarna (SE)

(72) Inventor: Thomas Renner, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/568,593

(22) PCT Filed: Apr. 8, 2022

(86) PCT No.: PCT/EP2022/059470
§ 371 (c)(1),
(2) Date: Dec. 8, 2023

(87) PCT Pub. No.: WO2022/258242
PCT Pub. Date: Dec. 15, 2022

(65) Prior Publication Data
US 2024/0260519 A1 Aug. 8, 2024

(30) Foreign Application Priority Data
Jun. 10, 2021 (EP) .................................... 21178788

(51) Int. Cl.
*A01G 25/09* (2006.01)
*A01D 34/00* (2006.01)
(Continued)

(52) U.S. Cl.
CPC .......... *A01G 25/092* (2013.01); *A01D 34/008* (2013.01); *A01D 2101/00* (2013.01); *B60L 53/30* (2019.02); *B60L 2200/40* (2013.01)

(58) Field of Classification Search
CPC ....... A01G 25/092; A01G 25/09; B60L 53/30; B60L 2200/40; A01D 34/008; A01D 34/006; A01D 2101/00
See application file for complete search history.

(56) References Cited

U.S. PATENT DOCUMENTS 9,276,419 B2 * 3/2016 Borinato .............. G05D 1/0225
9,603,300 B2 * 3/2017 Pettersson ............ G05D 1/0246
(Continued)

FOREIGN PATENT DOCUMENTS

CN    109566065 A    4/2019
CN    109960253 A    7/2019
(Continued)

OTHER PUBLICATIONS

International Search Report and Written Opinion for corresponding International Application No. PCT/EP2022/059470 mailed Jul. 20, 2022, all pages cited in its entirety.
(Continued)

*Primary Examiner* — John D Walters
(74) *Attorney, Agent, or Firm* — Burr & Forman LLP

(57) ABSTRACT

The invention relates to a station (1) for a self-moving device (2), in particular lawn-care self moving device, comprising at least one support member, in particular wall (14), and at least one canopy part (10), wherein the canopy part extends from the at least one wall (14) and is configured for parking the self-moving device at least partially under the canopy part, wherein the station is provided with a water inlet (15) and water supply device (30) and an electrical power inlet (16) and an electrical supply device (32), the water supply device (30) and the electrical supply device (32) being configured for connecting the self-moving device (2). The invention further relates to a system (3) comprising the station and the self-moving device (2).

14 Claims, 4 Drawing Sheets

(51) Int. Cl.
　　*A01D 101/00*　　　(2006.01)
　　*B60L 53/30*　　　(2019.01)

(56) References Cited

U.S. PATENT DOCUMENTS

| | | | |
|---|---|---|---|
| 10,953,985 B2* | 3/2021 | Hackert | B64C 39/024 |
| 11,469,604 B2* | 10/2022 | Towner | B60L 53/35 |
| 2019/0023396 A1 | 1/2019 | Hackert et al. | |

FOREIGN PATENT DOCUMENTS

| | | |
|---|---|---|
| CN | 209234273 U | 8/2019 |
| CN | 211353151 U | 8/2020 |
| CN | 212957857 U | 4/2021 |
| DE | 102008041323 A1 | 2/2010 |
| WO | 2016202290 A1 | 12/2016 |

OTHER PUBLICATIONS

International Preliminary Report on Patentability for corresponding International Application No. PCT/EP2022/059470 mailed Jun. 21, 2023, all pages cited in its entirety.

* cited by examiner

STATION AND SYSTEM FOR A SELF-MOVING DEVICE

BACKGROUND OF THE INVENTION

The invention concerns a station for a self-moving device, in particular a lawn-care self-moving device and a system of the self-moving device and the station.

CN 209 234 273 U relates to a utility model providing a charging station and an intelligent robot system. The charging station comprises a main body, and a charging seat, a marker post, three marker post mounting parts and a positioning auxiliary mechanism which are positioned on the main body.

DE 10 2008 041 323 A1 discloses an irrigation robot. The robot has a driving device and an irrigation device. The device has a hose, a hose reel and an integrated circular sprinkler. The document further discloses an irrigation system with such a robot and supply units for supplying water and electricity. The supply units are fixedly arranged in a predetermined area. The robot is docked to a first supply unit and irrigates a first area. After finishing the first area, the robot may undock the first area, move to the second supply unit, dock to this second unit and starts irrigating a second area. The supply units have to be installed in the ground beforehand and be provided with water and electric lines to each of the supply units.

CN 109 960 253 A discloses an automatic working system comprising a self-mobile device for executing a first task in a defined working area and an additional device in a second working area. The self-mobile device can undock from the additional device. The additional device may have additional wheels, on which wheels it is placed in an undocked state. The self-mobile device may be an intelligent mower, the additional device may be a watering device. The document further the system may comprises a base station. The base station may comprise a water supply. The document does not disclose to leave the system after use of the additional device and/or the complete device in a defined state. The self-mobile device is large and in the option with the tank heavy, which might induce problems when the ground is not flat or soft.

SUMMARY OF THE INVENTION

It is an objective of the present invention to provide a station for a self-moving device, in particular a lawn-care self-moving device and a system of the self-moving device and the station with an improved user comfort and low installation costs and work.

This objective is achieved by a station according to claim 1 and the system according to claim 9.

In accordance with a first embodiment of the present invention a station for a self-moving device, in particular lawn-care self-moving device, comprises at least one support member, in particular wall, and
at least one canopy part.

The canopy part extends from the at least support member, in particular one wall and is configured for parking the self-moving device at least partially under the canopy part. This parking allows to define a defined unused state and allows to reduce environmental impact on the self-moving device.

The station is provided with a water inlet and water supply device as well as an electrical power inlet and an electrical supply device. The water supply device and the electrical supply device are configured for connecting the self-moving device. The above support member might be a pillar or a wall. If the support member is a wall, this is in particular a rear wall of the station. If the support member is a pillar, there are preferably at least two pillars arranged at opposite side of the canopy part or there might be for example for pillars arranged at sides of the canopy part or at edges of the canopy part.

The canopy part may extend in particular over such a distance that the self-moving device may completely move under the canopy. In this embodiment, the canopy part protects the self-moving device from sun-shine or rain if parked in the station.

The water supply device and the electrical supply device are preferably arranged inside the station, in particular at the support member, in particular at the wall, in particular rear-wall, under the canopy part. Thus, the water supply device and the electrical supply device are protected from environmental impact, in particular rain and sun shine.

The water supply device comprises in particular a water socket or a connection sleeve, in particular for connecting a hose. The water supply device is configured for connecting the self-moving device, in particular a hose, attached to the self-moving device. In particular, the water socket or connection sleeve is arranged such, that the self-moving device may dock to the socket or open contacts.

Alternatively or additionally the electrical device comprises an electrical socket or open contacts, wherein the electrical device optionally comprises a transformator and/or fuses. In particular the electrical socket or contacts are arranged such, that the self-moving device may dock to the socket or open contacts. In a further alternative embodiment, the electrical device may be an induction coil for inductive charging of the self-moving device.

The water inlet may be provided with a connection sleeve for connecting a house water line or a hose connectable to a water tap and/or wherein the power supply inlet is provided with a power cord and a plug. In this configuration the station is very comfortable and easy to install.

The station may further comprise a second wall and a third wall, being attached to the wall being a rear wall, the second and the third wall being side walls facing each other. The second and the third wall may be attached as well to the canopy part. Alternatively the second and the third wall may have a top designed for supporting the canopy part. The wall and/or the second wall and/or the third wall may be provided with a flange part extending to an outside and/or inside of the station forming a foot section. The flange part may enhance a stability of the station when standing on the ground, in particular lawn.

The canopy part is connected by a hinge to the support member, in particular the wall, and/or is releasably connected to the support member, in particular the wall. In this embodiment, the canopy part may be folded off or taken off to access to parts under the canopy.

In an embodiment, the station may further comprise a bottom wall connected at least to the support member, in particular a wall, and facing to the canopy part. The bottom wall is in particular configured for supporting a self-moving device inside the station. The bottom wall has in particular the advantage that water supply device and an electrical supply device have a fixed height with respect to the bottom wall.

The canopy part may be provided with a suspension device for attaching a top module of the self-moving device, in particular a watering unit of the lawn-care self-moving device. The suspension device might comprise two bracket, in particular L-shaped brackets. The lower part of the L-shaped brackets may be designed for supporting the top module.

According to a second embodiment of the invention relates to a system comprising a station as described with the first embodiment and a self-moving device.

The self-moving device comprises a body and at least two wheels. A motor and a control unit is provided with the self-moving device for driving the device. In particular the self-moving device comprises three wheels or four wheels, wherein one or two of the wheels are driven wheels.

The self-moving device is connectable to the water supply device and/or electrical supply device.

The self-moving device may have a bottom module having a first function and a top module having a second function. The bottom module may be a lawn mower. The bottom module might be provided with a module coupling unit. The top module might be as well provided with a module coupling unit. The module coupling units might be respective positive locking units or magnetic coupling units configured for coupling with the respective other module coupling unit.

The self-moving device may comprise a hose and a reel. The hose may be a lay-flat hose. The reel might be a driven reel, in particular electrically driven reel. The control unit of the self-moving device might be configured for adjusting a speed of the self-moving device as well as of the reel. In particular, the control unit might be adapted for adjusting a turning speed of the reel depending on the speed of the self-moving device, in order to avoid tensioning the hose or the formation of loop or slipknots. In particular, the hose and the reel are located on the top module. The reel may have a vertical axis for rotating the reel. A reel with a vertical axis allows a more flat design.

The self-moving device may be a lawn-care self-moving device.

The top module may comprise a watering module or comprises at least one nozzle attached to the hose. In particular, the watering module comprises the nozzle. Nozzle and hose are in fluid connection. The watering module may be arranged above the reel and/or concentrically with the reel. The watering module may be in fixed in position with the top module, in position with the reel or might be separably turnable around a vertical axis. In an embodiment, the watering module comprises a contour sprinkler.

The top module may comprise at least one attachment device for attaching the top module to the suspension device at the canopy. The attachment device might be an outer rim of the reel. Alternatively, the attachment device might be for example a hook. In particular, attachment device and suspension device might be designed for positive locking the one with the other.

The self-moving device may comprise a battery, rechargeable when attached to the electrical supply device of station.

BRIEF DESCRIPTION OF THE DRAWING

The various aspects of the invention, including its particular features and advantages, will be readily understood from the following detailed description and the accompanying drawing, in which.

DETAILED DESCRIPTION OF PREFERRED EMBODIMENTS

Figure 1:
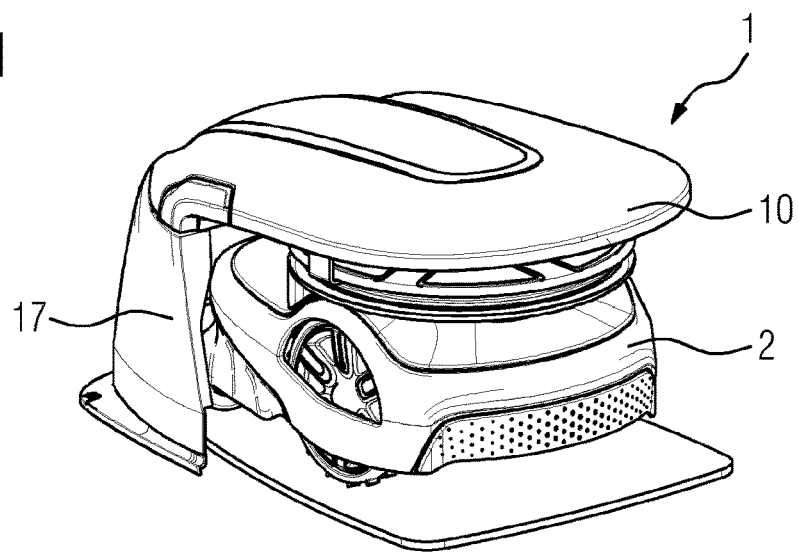
FIG. 1 shows a system in an embodiment in a perspective view.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

Figure 2:
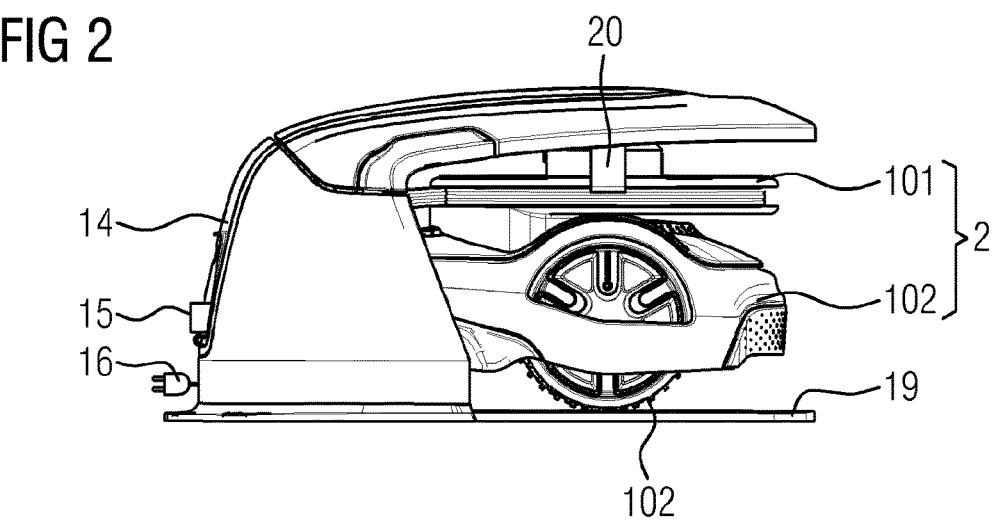
FIG. 2 shows the system in a side view.
Figure 3:
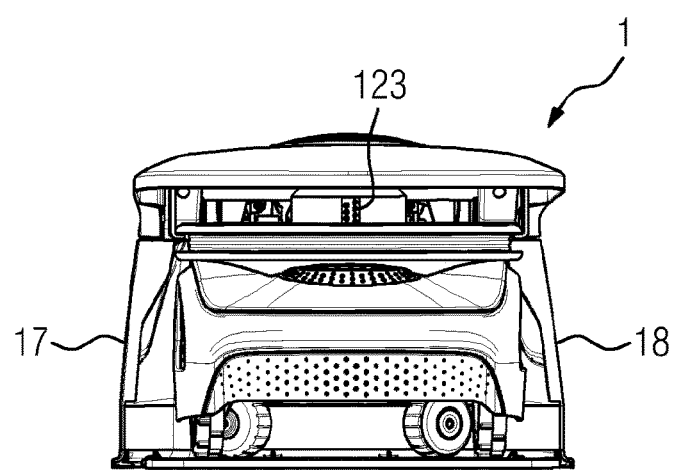
FIG. 3 shows the system in a front view.

FIGS. 1 to 3 show the station 1 for a self-moving device, being a lawn-care self-moving device. The station 1 comprises a wall 14 being a rear wall and a canopy part 10, wherein the canopy part extends from the wall 14. FIGS. 1-3 show the station 1 with an optional second wall 17 and third wall 18, wherein the second wall 17 and the third wall 18 are sidewalls and face each other. The sidewalls 17, 18 are connected with the rear wall 14 to form a partially closed space. The station is further configured with a bottom wall 19, which is attached to the wall 14 facing the canopy part 10. The station forms a stiff and portable body. The bottom wall has in particular the advantage to have a fixed height of the canopy part with respect to the bottom wall, and in particular of a water supply device and electrical supply device described below, even if the ground is soft or muddy.

On the backside of the wall 14, thus facing away from the canopy part a water inlet 15 and an electrical power inlet 16 is provided.

The station 1 is configured for parking a self-moving device under the canopy. The self-moving device 2 is parked on the bottom wall 19. The self-moving device 2 and the station 1 form a system 3.

Figure 4:
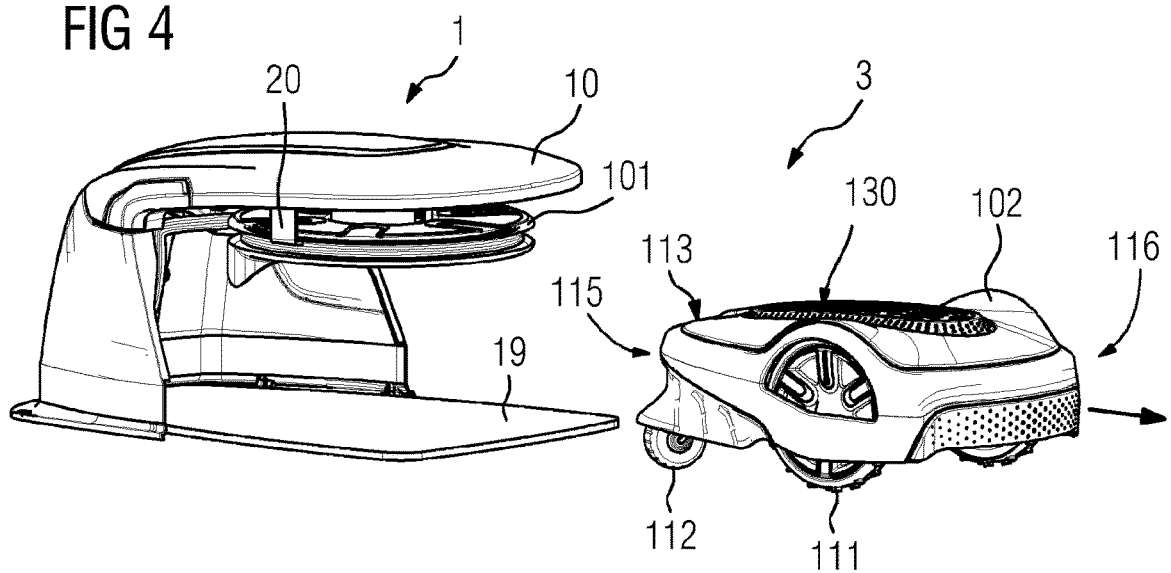
FIG. 4 shows the system, wherein a top module is suspended from the canopy

The self-moving device 2 of the system comprises a top module 101 and a bottom module 102. The bottom module 102 comprises a body 110 and at least two wheels 111. The two wheels 111 are driven wheels. Two auxiliary wheels 112 are arranged at the opposing end of the bottom module 102 of the self-moving device 2 as shown in FIG. 4. However, other configurations of driven and optional non-driven wheels are possible.

Within the body 110 a motor and a control unit is arranged for the self-moving function of the device. The body 110 is preferentially further provided with electrical contacts 113 for connecting to the electrical supply device 32. The bottom module 102 is preferentially a lawn-mowing device.

Figure 7:
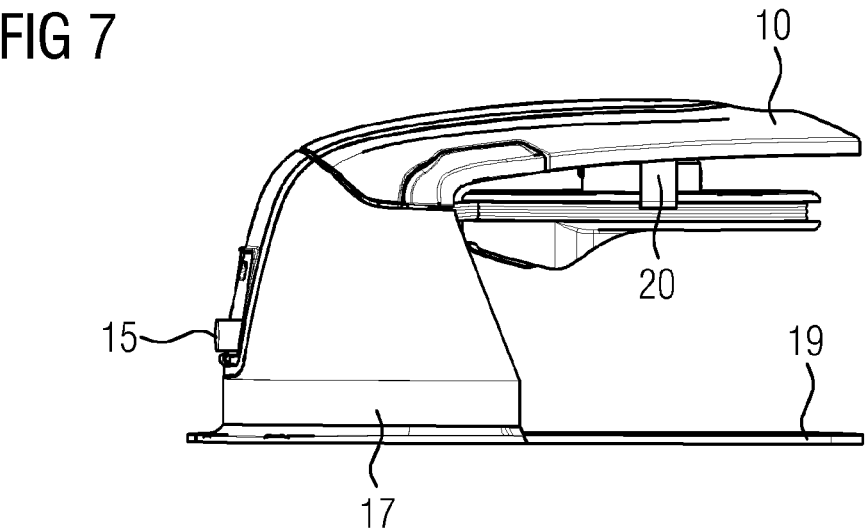
FIG. 7 shows the system, wherein a top module is suspended from the canopy.

FIG. 4 further shows that the top module 101 is attached to the canopy part 10 of the station with a suspension device 20. The suspension device 20 is configured in the present embodiment with two opposing brackets for inserting the top part as shown in the side view depicted in FIG. 7. In this figure, only the bottom module 102 of the self-moving device is leaving the station 1, while the top module 101 is attached to the canopy part of the station. This configuration has the advantage that the self-moving device has not to carry around the top module 101, when not needed. It saves energy and reduces damage in particular to the lawn. On the top of the bottom module 102, there is a module coupling unit 130 arranged which might be for example a magnetic coupling unit.

Figure 5:
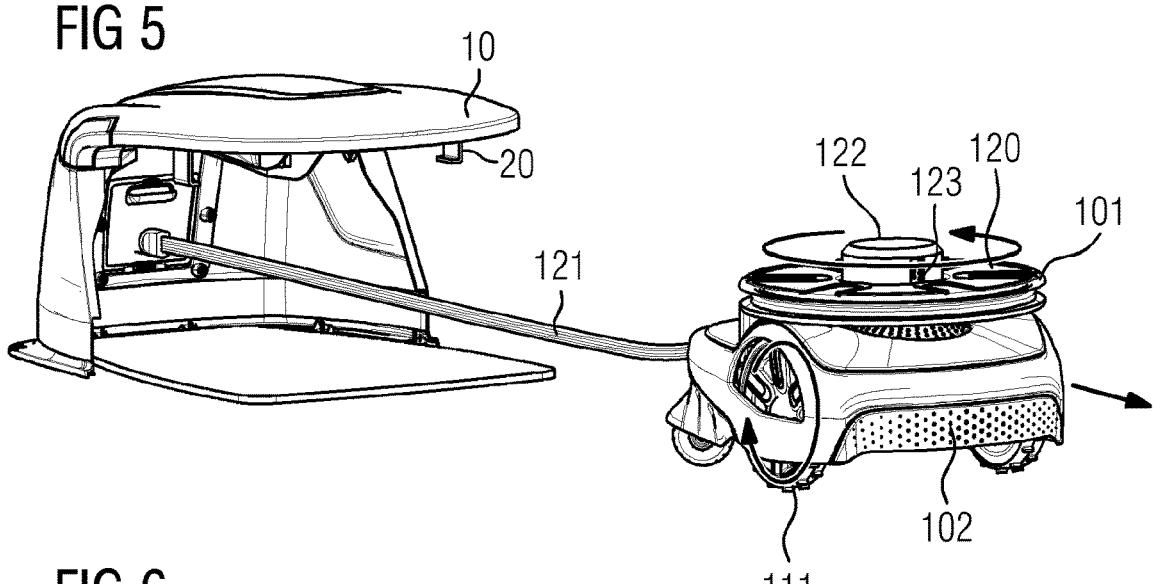
FIG. 5 shows the system with a connected water hose with the device moving away from the station
Figure 6:
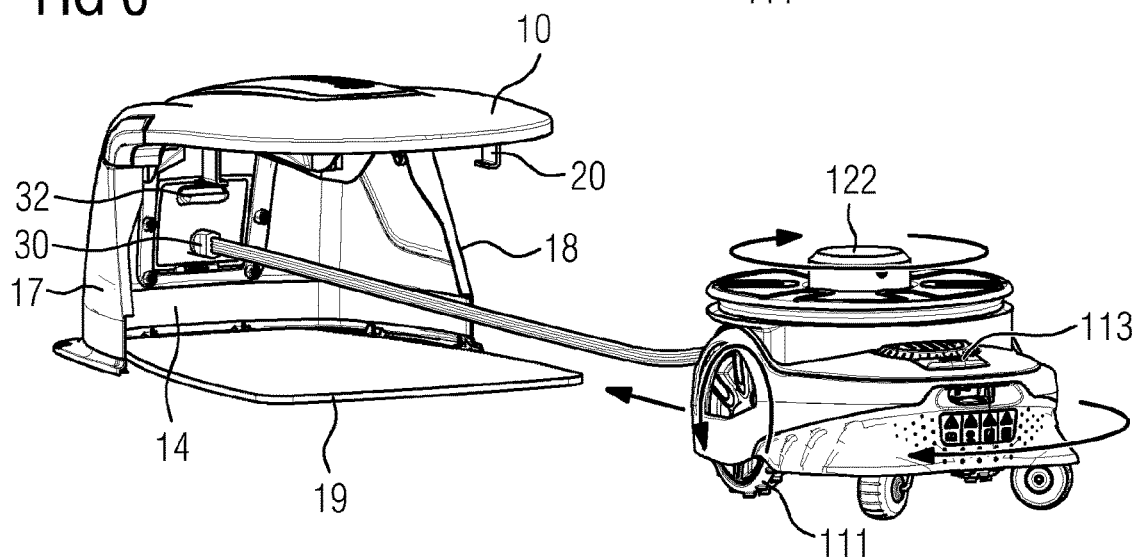
FIG. 6 shows the system with a connected water hose.

In FIGS. 5 and 6, the top module 101 of the self-moving device is attached to the bottom module 102. The top module 102 is provided as watering module. The top module 102 comprises a reel 120 having a vertical axis. Due to the vertical axis of the reel 120, the top module 101 has a flat design. The reel 120 is provided with a hose 121. This hose 121 can be connected to the water supply device 30 arranged at the wall 14 under the canopy 10. Thus, the top module 101 is connectable to the water supply device 30. The electrical supply device 32 is arranged above the water supply device, in the present embodiment. However, a different arrangement are possible.

Figure 9:
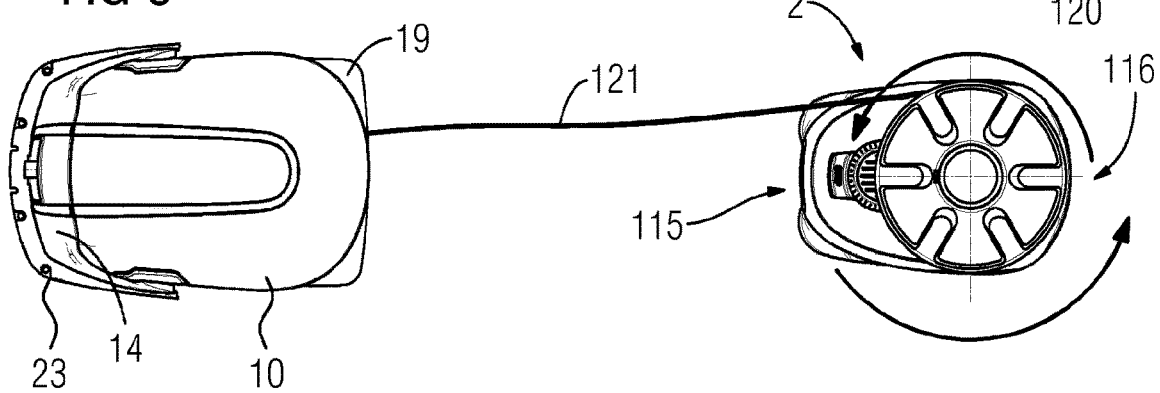
FIG. 9 shows a top view of the system as shown in FIG. 6.
Figure 10:
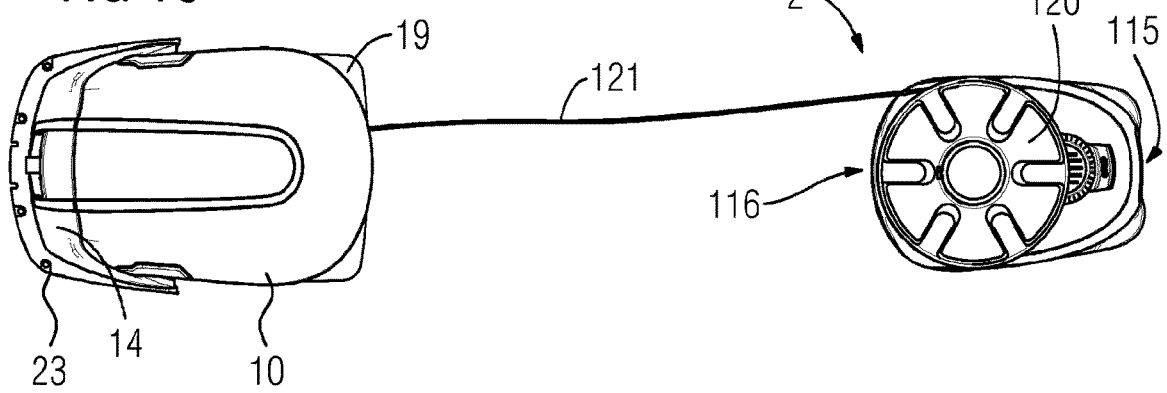
FIG. 10 shows a top view of the system as shown in FIG. 5.

The reel 120 is configured to unreel the hose when the self-moving device 2 leaves the station with the hose 121 attached to the water supply device 30 as depicted in FIG. 5 and to reel the hose to the reel when traveling back to the station as depicted in FIG. 6. According to the present embodiment, the self-moving device is driven with the wheels 111 at a front side 115 of the device. Due to the reel 120 with a vertical axis, the self-moving device 2 may drive forward when departing from the station as shown in FIG. 5 and FIG. 10 and may drive forward when returning to the station 1 as shown in FIG. 6 and FIG. 9. Thus, backing up is only necessary at the very parking procedure at the station. The self-moving device may enter the station with a front-side 115 or a back-side 116 first into the station. Thus, turning is only optionally necessary. FIGS. 9 and 10 shows a top view of the station 1 and the self-moving device 2 with a connected hose 121.

The top module 101 is further provided with a watering module 122 and a nozzle 123 being arranged above the reel 120. Reference is also made to FIG. 3. The nozzle 123 is in fluid connection with the reel 120. In particular, the nozzle is in fixed position with the top module 101, or with the reel 120, or separately turnable around a vertical axis.

Figure 8:
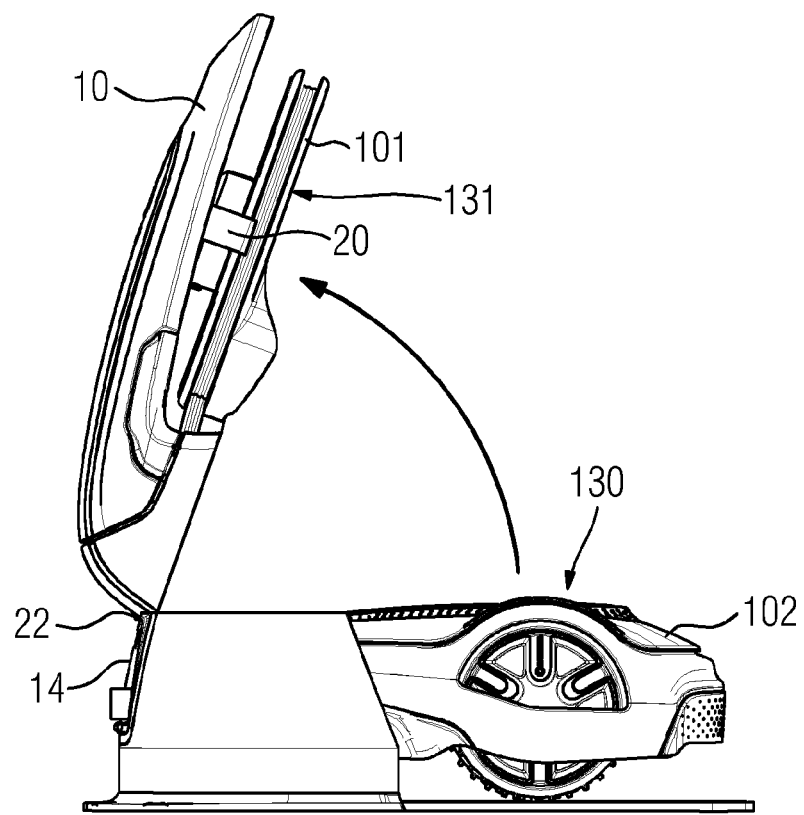
FIG. 8 shows the system of FIG. 7 with an opened canopy.

FIG. 8 shows a side view of the station 1, wherein the canopy part 10 is opened. The canopy part 10 is attached to the wall 14 via a hinge 22. The canopy part 10 can be turned around this hinge 22 to give access to the self-moving device. In particular, only the bottom module 102 of the self-moving device is placed on the bottom wall 19, while the top module 101 is attached to the canopy part 10 by the suspension device 20. In this configuration the bottom module 102 is configured with a module coupling unit 130 on the top side of the bottom module 102. On the bottom side of the top module 101, there is arranged a further module coupling unit 131. The module coupling unit 130 and the further module coupling unit 131 are configured for coupling the top module 101 with the bottom module 102.

Figure 11:
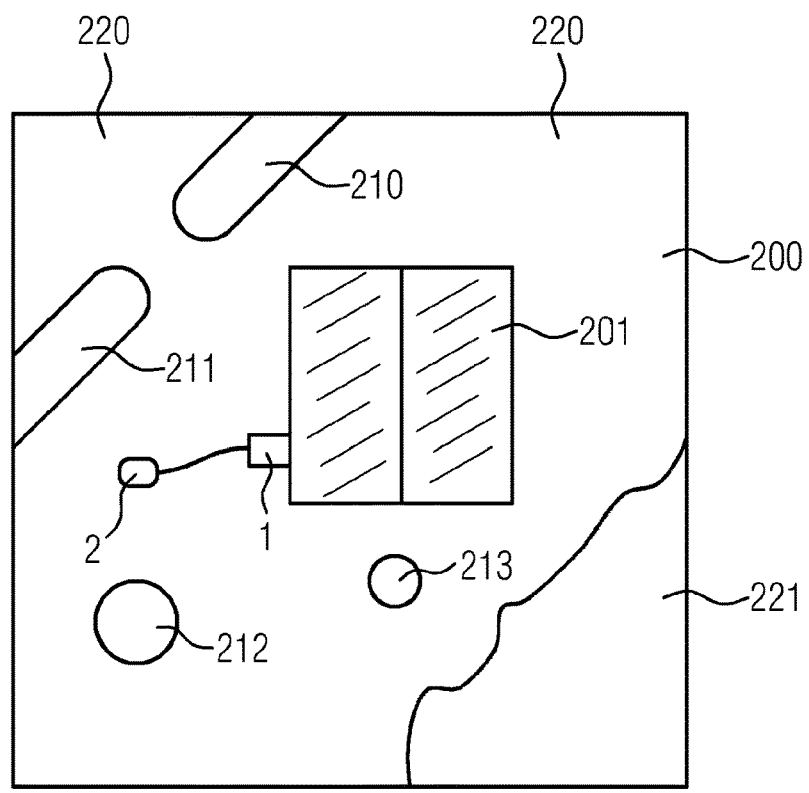
FIG. 11 shows an area with system.

FIG. 11 shows a garden 200 with a house 201 and a lawn 220. The system 3 comprising a station 1 and a lawn-care self-moving device 2 as depicted in the preceding figures are placed in the garden. The station 1 forms a basis for the lawn-care self-moving device 2. The device 2 is attached with the hose 121 to the station 1. When moving, the lawn-care self-moving device unreels the hose 121 and the hose 121 is laid down on the lawn 220 following the path of the movement of the lawn-care self-moving device 2. The watering module 122 can be provided with a nozzle 123 for watering a lawn area around a position of the lawn-care self-moving device. Alternatively or additionally the lawn-care self-moving device may be provided for watering a flower-bed 221 or certain plants, like trees 212, 213. The present system is able to work for complicated areas wherein lawn areas are separated from each other by walls 210, 211 with small passageways between the walls 210, 211. The lawn-care self-moving device may pass through this passageways and water the lawn 220 or plants in the respective areas. The self-moving device 2 may further move around the house 201 or the trees 212, 213 for watering all regions of the lawn 220 or alternately for cutting the lawn 220 with a moving module. An installation of a network of water supply points is therefore not necessary.

LIST OF REFERENCE NUMERALS

1 Station
2 self-moving device
3 system
10 canopy part
14 wall
15 water inlet
16 electrical power inlet
17 side wall
18 side wall
19 bottom wall
20 suspension device
22 hinge
23 flange part
25 water supply device
32 electrical supply device
101 top module
102 bottom module
110 body
111 wheel
112 auxiliary wheel
113 electrical contact
115 front side
116 back side
120 reel
121 hose
122 watering module
123 nozzle
130 module coupling unit
131 module coupling unit
200 Garden
201 House
210 wall
211 wall
212 tree
213 tree
220 lawn
221 flower bed

The invention claimed is:

1. A station for a self-moving device, the station comprising:
   a support member formed as a wall,
   a canopy part,
   wherein the canopy part extends from the support member and is configured for parking the self-moving device at least partially under the canopy part, and
   a water inlet and water supply device and an electrical power inlet and an electrical supply device,
   wherein the water supply device and the electrical supply device are configured for connecting the self-moving device, the water supply device and the electrical supply device being arranged inside the station at the support member, under the canopy part; and wherein the canopy part is provided with a suspension device for attaching a top module of the self-moving device.

2. The station according to claim 1, wherein the water supply device comprises a water socket or a connection sleeve for connecting a hose, and the electrical device comprises an electrical socket or open contacts or an induction coil, wherein the electrical device comprises a transformator or fuses.

3. The station according to claim 1, wherein the water inlet is provided with a connection sleeve for connecting a house water line or a hose connectable to a water tap and
wherein the power supply inlet is provided with a power cord and a plug.

4. The station according to claim 1,
wherein the station further comprises a second wall and a third wall, being attached to the support member being a being a rear wall, the second and the third wall facing each other.

5. The station according to claim 1, wherein the canopy part is connected by a hinge o the support member,
and the canopy part is releasably connected to the support member.

6. The station according to claim 1, further comprising a bottom wall connected at least to the support member, and facing to the canopy part.

7. The station according to claim 1, wherein the canopy part is provided with a suspension device for attaching a watering unit of the self-moving device.

8. A system comprising a station and a self-moving device, the station comprising:
comprising:
a support member formed as a wall,
a canopy part,
wherein the canopy part extends from the support member and is configured for parking the self-moving device at least partially under the canopy part, and
a water inlet and water supply device and an electrical power inlet and an electrical supply device,
wherein the water supply device and the electrical supply device are configured for connecting the self-moving device,
the water supply device and the electrical supply device being arranged inside the station at the support member, under the canopy part,
wherein the canopy part is provided with a suspension device for attaching a top module of the self-moving device,
wherein the self-moving device comprises a body and at least two wheels, and
wherein the self-moving device is connectable to the water supply device or electrical supply device.

9. The system according to claim 8, wherein the self-moving device has a bottom module having a first function and the top module having a second function,
wherein the bottom module and the top module each comprises a module coupling unit for coupling the other of the bottom module or the top module, respectively.

10. The system according tom claim 9, wherein the self-moving device comprises at least one battery, rechargeable when attached to the electrical supply device of station, wherein each of the top module and the bottom module comprises a battery.

11. The system according to claim 8, wherein the self-moving device comprises a hose, and a reel,
wherein the hose and the reel are located on the top module, wherein the reel has a vertical axis.

12. The system according to claim 8, wherein the self-moving device is a lawn-care self-moving device.

13. The system according to claim 8, wherein the top module comprises a watering module, wherein the watering module comprises at least one nozzle.

14. The system according to claim 8, wherein the top module comprises at least one attachment device for attaching the top module to the suspension device at the canopy part.

* * * * *

UNITED STATES PATENT AND TRADEMARK OFFICE
CERTIFICATE OF CORRECTION

Page 1 of 1

PATENT NO. : 12,127,511 B2
APPLICATION NO. : 18/568593
DATED : October 29, 2024
INVENTOR(S) : Thomas Renner It is certified that error appears in the above-identified patent and that said Letters Patent is hereby corrected as shown below:

In the Claims

In Column 7, Claim 4, Line 21, "being a being a rear wall" should read -- being a rear wall --

In Column 7, Claim 5, Line 25, "hinge o the support" should read -- hinge to the support --

In Column 7, Claim 8, Line 36, below "device, the station comprising:" delete "comprising:"

In Column 8, Claim 9, Line 19, "comprises a module" should read -- comprise a module --

In Column 8, Claim 10, Line 22, "according tom claim" should read -- according to claim --

Signed and Sealed this
First Day of April, 2025

Coke Morgan Stewart
*Acting Director of the United States Patent and Trademark Office*